UNITED STATES PATENT OFFICE.

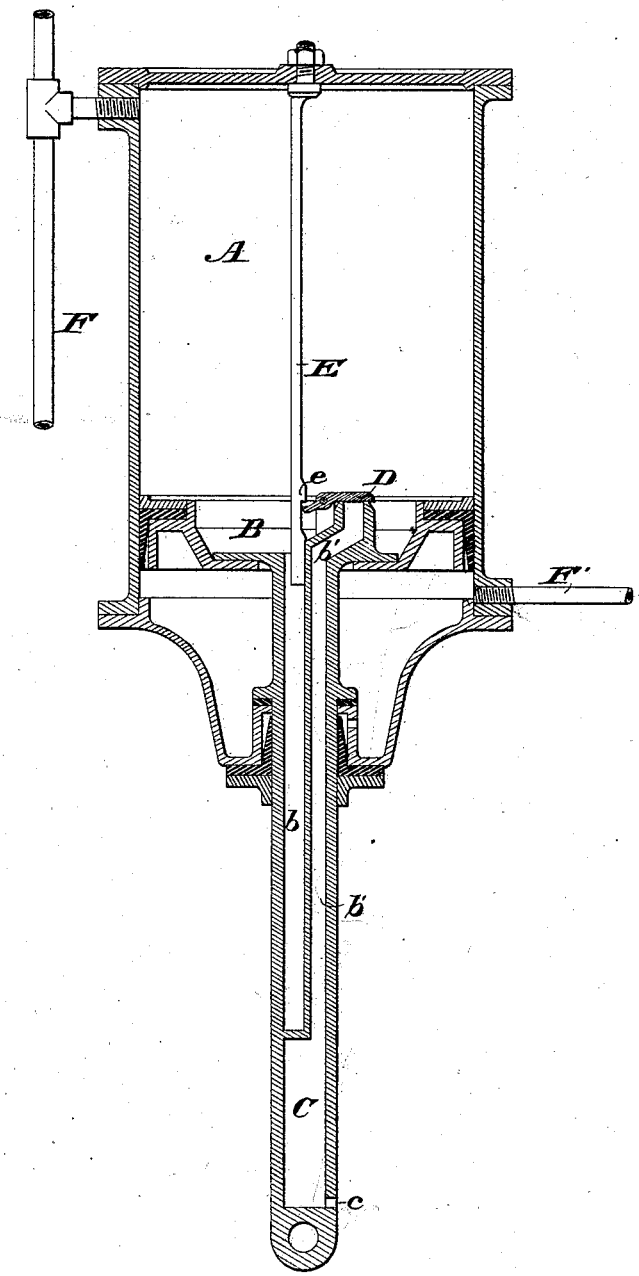

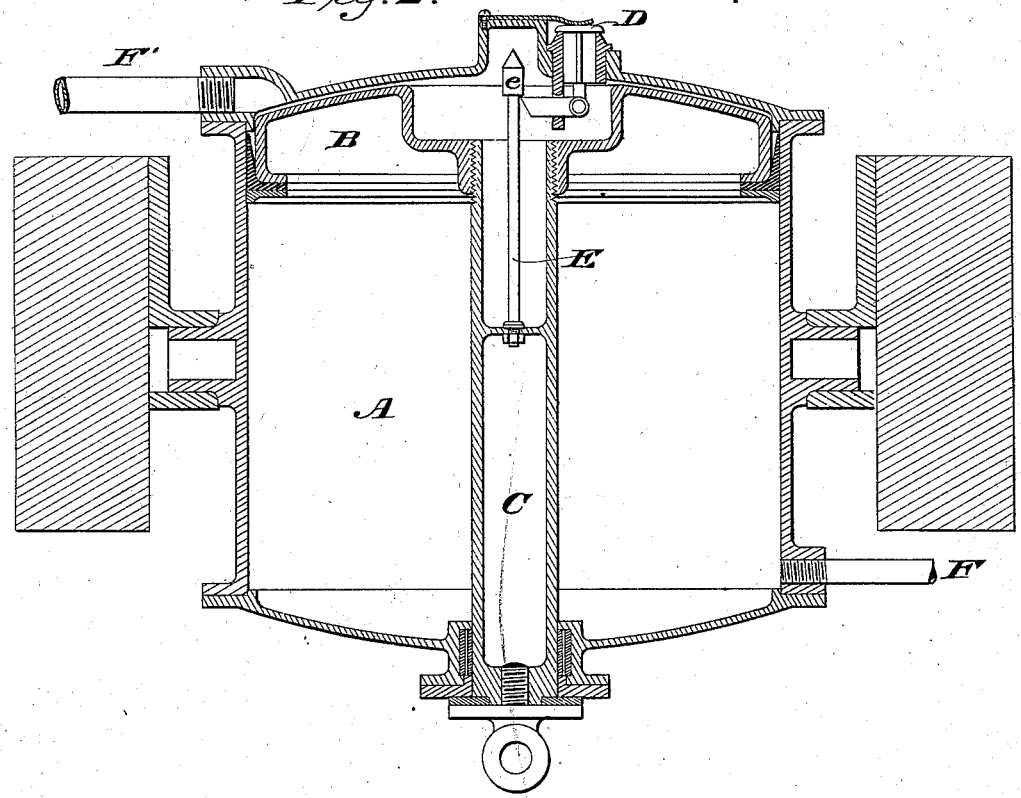
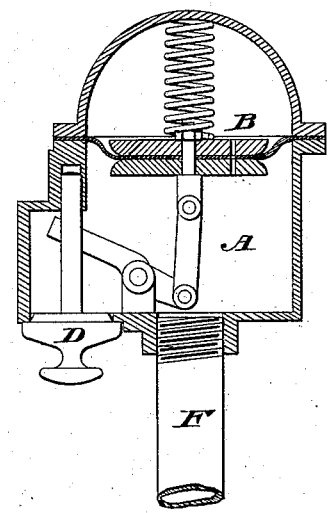

RICHARD D. SANDERS, OF BIRMINGHAM, COUNTY OF WARWICK, ENGLAND.

IMPROVEMENT IN CONTINUOUS BRAKES FOR RAILWAY-CARS.

Specification forming part of Letters Patent No. 219,177, dated September 2, 1879; application filed July 16, 1879; patented in England, March 12, 1879.

*To all whom it may concern:*

Be it known that I, RICHARD DAVID SANDERS, of Birmingham, in the county of Warwick, England, have invented new and useful Improvements in Continuous Brakes for Railway-Cars, for which Letters Patent No. 980 were granted to me in England on March 12, 1879, and of which the following is a specification.

My invention relates to that class of continuous railway-brakes that are operated by fluid-pressure, the pressure being produced either by compressing or forcing the fluid, or by creating a vacuum on one side of a piston while the other is subjected to pressure.

The object of my invention is to rapidly and automatically create the necessary pressure on one side of the piston when the brakes are to be applied, and I will now describe the method of accomplishing this, reference being had to the accompanying drawings, in which—

Figure 1 is a sectional view of the cylinder and piston, showing the automatic device for opening the valve. Fig. 2 is a sectional view of a modification of my invention, or of the arrangements of parts when a vacuum is employed. Fig. 3 is a sectional view of an automatic valve for admitting air to the continuous pipe.

A is the cylinder, in which the piston B moves. C is the piston-rod, made hollow, and containing two chambers or passages, $b$ $b'$. D is a valve covering the inner end of the passage $b'$. E is a rod fastened to the cover of the cylinder A, and provided with a projection, $e$. This rod E enters the passage $b$ when the piston moves toward the cover, to which the rod is fastened, and bears against the partition between the passages $b$ and $b'$, but has sufficient elasticity to enable it to be thrown to the other side of the passage $b$, which is large enough to admit of the necessary motion.

$c$ is an exhaust-port, leading from the passage $b'$ in the piston-rod C.

F is a continuous pipe for supplying compressed air to the reservoirs, or for connecting the main reservoir on the engine to the small reservoirs on each car, and for connecting one end of the cylinder A with the main reservoir.

F' is a pipe connecting the other end of the cylinder A with the small reservoir on each car.

The connections between the continuous pipe F and the small reservoirs should be provided with the usual check-valves to prevent the reflux of the air.

In reach of the engine-driver should be a suitable valve for closing the connection between the pipe F and the main reservoir, at the same time opening the pipe F' to the atmosphere, as will be obvious.

As shown in Fig. 1 of the drawings, the piston is at one end of its stroke and the brakes are supposed to be off. The pipe F connects one end of the cylinder with the main reservoir, and the pipe F' the other end with one of the small reservoirs, so that the pressure in all parts is equal. The piston is held in this position and the brakes kept off by the excess of pressure on one side due to the larger effective area, which exceeds the effective area of the other side by the space taken up by the piston-rod C, which is made large, both for the purpose of making the requisite difference of area on the opposite sides of the piston, and also for providing room for the chambers $b$ $b'$.

To apply the brakes, the pipe F is shut off from the compressed-air reservoir and opened to the air. The pressure on that side of the piston is thereby reduced, and the compressed air from the pipe F' moves the piston, and would apply the brakes; but it is evident that on an ordinary train the many angles and length of the continuous pipe F would, in a great measure, retard the flow of the air, so that an appreciable time would be required to properly apply the brakes; and my invention has for its object to remedy this defect and provide a means for allowing the air to escape instantaneously. To accomplish this I arrange the rod E and the piston-rod C, with its chambers $b$ $b'$ and valve D, as before described. It is evident that as soon as communication is made through the pipe F between the outside air and the cylinder A the pressure will decrease; then the compressed air from the pipe F', acting on the piston, will start it toward the other end of the cylinder; but as soon as it moves the projection $e$ on the rod E catches on the lever of the valve D and opens it, thereby affording a short and easy escape for the air in the cylinder through the passage $b'$ and exhaust-port $c$, thus immediately relieving the opposing pressure, and the brakes are instantly applied.

It is evident that the position and length of the projection $e$ can be varied so as to regulate the action of the valve D, as may be required.

To release the brakes the pressure is restored to the piston through the pipe F, and the piston forced back and held by the excess of pressure due to the difference of area of the two sides.

The modifications will be readily understood from the drawings.

Fig. 2 shows the arrangement when a vacuum is used, the parts being reversed. The valve D is placed on the cylinder-cover, and the rod E with its projection $e$ is fastened to the piston.

Fig. 3 shows a modification for admitting air rapidly to the continuous pipe F, a diaphragm being substituted for a piston. In all cases the principle is the same—viz., a slight motion of the piston opens a valve for the rapid passage of the fluid.

I am aware that valves operated by independent pistons or diaphragms working in separate and distinct cylinders placed between the reservoirs and brake-cylinders have been employed; but this not only increases the number of parts and cost of manufacture, but also requires time for the independent movements to be made by the separate pistons or diaphragms.

I claim as my invention and desire to secure by Letters Patent—

The combination, substantially as hereinbefore set forth, of a cylinder, a piston or diaphragm, a piston-rod with interior chambers, and a valve and valve-operating mechanism.

In testimony whereof I have hereunto subscribed my name.

RICHARD DAVID SANDERS.

Witnesses:
   CHAS. POULTNEY,
   W. E. TAYLOR.